Feb. 18, 1958 P. RAVASIO 2,823,910
CEMENT FURNACE
Filed May 27, 1953
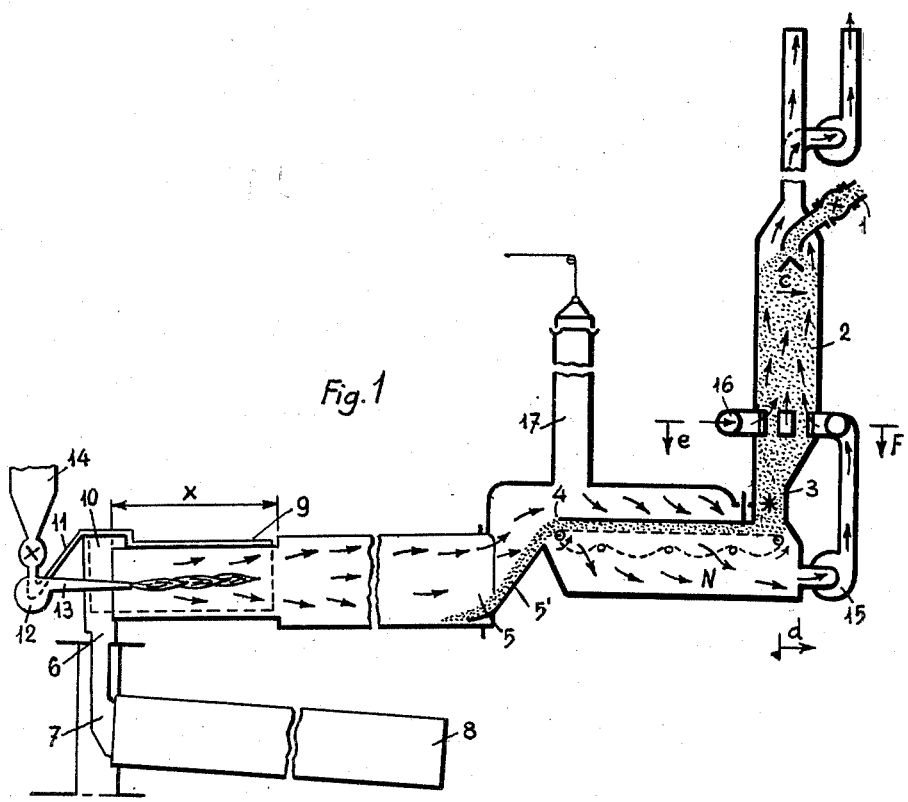
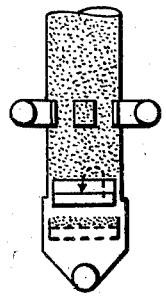
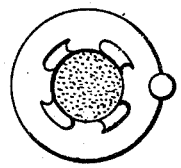

United States Patent Office 2,823,910
Patented Feb. 18, 1958

2,823,910

CEMENT FURNACE

Paolo Ravasio, Cisano Bergamasco, Italy, assignor to Ansaldo S. A., Societa per Azioni, Genoa, Italy Application May 27, 1953, Serial No. 357,833

Claims priority, application Italy June 20, 1952

4 Claims. (Cl. 263—32)

This invention relates to a plant for thermally treating a granular material and more particularly to rotary furnaces for burning cement rocks, clinkers and the like.

In rotary furnaces of this character heretofore known, the previous drying of the material to be treated was usually obtained by spreading the material on a floor or grate divided in two sections by means of a division wall; and warm gas coming from the furnace (about 1000° C.) mixed with sufficient quantity of fresh air in order to carry the temperature of the mixture to 200° C. was sent through the section of the floor on which the damp grains arrive; while gas at the temperature of the mixture was sent to the other section of the flooring. Such a proceeding was necessary due to the fact that should the gas at 1000° C. meet the cold and damp material, the grains of the material would burst due to too rapid evaporation of the water, followed by pulverisation with the result that the bed of material on the floor became impermeable causing full loss of draught condition and necessitated the use of large quantities of gas in the plant.

Another proceeding that has been prospected comprises the partial recovery of the gas passing underneath the floor in the section where the dry grains are, and sending it above the floor where the damp grains are, but such a double circulation of gas requires an additional fan and a further supply of hot gas with air.

The present invention, however, consists in a rotary furnace for burning cement rocks and clinker, comprising a tower adapted to receive from the top, the granulated cold and damp material, and to discharge it at the bottom on a flooring having a continuous grating, said flooring being mounted in a chamber in such a way as to divide it in two sections, the upper one of which is in connection with the hot gas coming from the furnace, and the lower one being connected by means of a suction device with a chamber surrounding a portion of said tower, said chamber communicating with the interior of the tower by means of perforations.

The invention will be more completely understood from the following detailed description which is given in conjunction with the accompanying drawing, in which:

Figure 1 is a general view of a rotary furnace for burning cement rocks and clinker, Figure 2 is a section of the tower, the line c—d of Figure 1, for drying and preheating the material, and Figure 3 shows a section of the tower on the line e—f of Figure 1.

With reference to Figure 1 of this drawing, the material to be treated, which comprises for example mashed or milled granulated rocks enters in a substantially vertical plant at 1, from where it falls down in a substantially vertical tower 2 and is discharged at 3 by means of a rotary distributor 20.

The material is then transported in a horizontal direction by means of a sliding or travelling grating or band 21 made of hinged grates and arranged in a horizontal chamber 31, the material eventually arriving at 4 from where it falls due to gravity to the position 5 via the ramp 5' coupled to the rotary furnace 22.

The inclined and rotating furnace 22 causes the material to descend and reach the discharge opening 6 from which it falls down the duct 7 which connects the furnace 22 with a cooling device 23 which may be of the rotary type, or a device provided with a grate (not shown). The material is then discharged into the open air at 8.

The primary combustion air is drawn from the jacket formed by the sleeve 9 which surrounds a portion of the rotary furnace 22 along section X, and by the jacket formed by a housing more fully described and shown in my copending application Serial No. 357,834, filed May 27, 1953, for "Rotary Furnace," around the fixed top 10 closing the discharge opening 6 of the furnace.

The primary air is sucked in through the duct 11 by fan 12, and is discharged into the furnace through duct 13 together with the combustible material which may be a gas, fluid or powder, coming from feeder 14.

The secondary air enters the furnace through duct 7 after having passed the cooler 23 for the burned material. The hot gas of the flame and the carbonic anhydride produced by the burning material come out from furnace 22 at 5 in order to pass onto the travelling grating or band 21 where, beginning from position 4 and along the whole surface of the band 21, it filters through the interstices and fissures of the band, drawing a further quantity of carbonic anhydride produced by the partial decarbonising of the material resting on the band.

At N the exhaust gases from the travelling grating 21 are conveyed to a main duct 25 connected to the circulation fan 15, which directs the gases into a main duct 26 connected with suitably arranged subsidiary ducts 16 surrounding the tower 2 and communicating with the same through openings, such as 27.

The gases pass through the interstices of the grains of the material, flow upwards in the tower 2, and subsequently enter the chimney 28 with the aid of a fan 29.

An additional chimney 17 arranged at the top of the horizontal chamber 31 and provided with a controlled pneumatically sealed cover 30 causes the regular draught of the rotary furnace 22 during the firing time and also allows exceptional emergency operations. During usual working the plant operates with the cover 30 closed.

The operation of the plant is as follows:

As the damp cold material must only meet with gas at a temperature of about 200° C., whilst the hot dry material must also meet gas at a temperature of 1000° C. and more, it follows that the gases coming out from the furnace 22 at a temperature of about 1000° C. are fully used along the whole surface of the travelling grating 21. This is possible because the material to be treated reaches the grating 21 when it is already dry and preheated, inasmuch as the contact of the gas at 1000° C. with cold and damp material would cause the grains to burst owing to a too rapid evaporation of the absorbed water, followed by pulverisation of the material.

The direct meeting of hot gas with cold and damp material, in order to avoid the "burst" of the grains, is only possible when the gas has a temperature of about 200° C.

5 kg. of indoor-air per 1 kg. of gas at 1000° C. are necessary to obtain a mixture of gas and air at the temperature of 200° C. This excess of air takes off the heat through the chimney because it flows out from same at the temperature of smoke, at 100° C.

In the plant according to the invention, all the gas coming from the furnace 22 passes through the dry and preheated material without any addition of indoor-air and recovers for new use the whole of the exhausted gas passing underneath the travelling grating 21 so as to obtain for the exhausted gas a temperature between 250° and 300° C.

The tower 2 cannot be directly fed by the gases from the furnace 22, because they are too hot, and consequently the grains would break and the draught condition would fail.

A new characteristic of the illustrated plant is the use of the heat exchanges in three separate steps, with a difference of temperature between the gas and the material. This is particularly convenient for the said heat exchanges, and effects a gradual progressive thermic preparation of the material. With this arrangement, the average temperature of the material in the tower 2 should be from 20°-30° to 100°-120° C. The average gas temperature in the tower 2 should be from 70°-80° to 250°-300° C. The average temperature of the material on the grating 21 should be from 100°-120° to 550°-600° C. Gas temperatures above the grating 21 should be 1000° C. (at outlet of the furnace 22).

The temperature of the material entering the furnace 22 should be 550-600° C.

The temperature of the material for clinkerisation in the furnace 22 should be about 1500° C.

The temperature of the flame gas in the furnace 22 should be approximately 2000° C.

The temperature of the material in the furnace 22 at its exit point should be approximately 1000° C.

The invention further provides the possibility of graduating in three separate plants the thermic preparation of the material, using only one circulation fan, the output of which is limited only by the combustion gas and the $CO_2$ developed by the material.

The advantages are:

Full use of the hot gas of the furnace without any addition of indoor-air in the grating; movement of the gas with only one fan; filtering of the powders of smoke in the cylindrical chamber with the recovery of the powders which assemble with material to be finished.

What I claim is:

1. A plant for thermally treating a granular material, comprising, in combination, a heating chamber, means for heating air to a high temperature in said heating chamber, a ramp coupled to said heating chamber for guiding heated air upwardly and outwardly from the heating chamber, a substantially horizontal chamber coupled by said ramp to said heating chamber so as to be flowed through by said heating air and to convert the same into hot air having a lower temperature than said heating air, a substantially horizontal traveling grate arranged in said horizontal chamber so as to subdivide the same into an upper part and a lower part and thereby divide the flow of air received via said ramp, a substantially vertical tower having an upper end and a lower end, said lower end being connected with the other end of said horizontal chamber, said grate being arranged with one end thereof below said lower end of said tower, said upper end of said tower receiving the granular material in damp condition at a low temperature, and means for conducting hot air from said lower part of said horizontal chamber into said tower at a level above said lower end of said tower, whereby the damp granular material being at the low temperature travels from said upper end of said tower down to said lower end thereof and is thereby preheated by said hot air flowing from said lower part of said horizontal chamber through said conducting means, the granular material being thereafter transported by said horizontal grate through said horizontal chamber thereby subdividing the flow of hot air therein into an upper relaitvely hotter part and a lower relatively cooler part cooled by passing through the granular material being on said traveling grate, said granular material passing afterwards through said heating chamber where it is brought into contact with said heating air at the high temperature so that the granular material is gradually heated in said tower, said horizontal chamber, and said heating chamber in three consecutive steps at gradually increasing temperatures preventing the grains of the material from bursting and being pulverized.

2. A plant as claimed in claim 1, said conducting means including a main duct connected to said lower part of said horizontal chamber, a fan arranged in said main duct so as to accelerate the flow of air through said main duct, and a plurality of subsidiary ducts connected to said main duct and provided, respectively, with openings communicating with said level of said tower.

3. A plant as claimed in claim 1, and a rotary distributor arranged in said tower near said lower end thereof, said distributor discharging said granular material from said tower into said horizontal chamber and to said one end of said grate, said distributor preventing air from entering said tower through said lower end thereof.

4. A plant as claimed in claim 1, a chimney connected to the upper part of said horizontal chamber, and adjustable means for establishing an adjustable connection between said chimney and the atmosphere.

References Cited in the file of this patent

UNITED STATES PATENTS

| | | |
|---|---|---|
| 1,180,455 | Truesdell | Apr. 25, 1916 |
| 2,036,952 | Middelboe | Apr. 7, 1936 |
| 2,125,263 | Ahlmann | Aug. 2, 1938 |
| 2,157,321 | Bussmeyer | May 9, 1939 |
| 2,466,601 | Lellep | Apr. 5, 1949 |
| 2,634,116 | Witt | Apr. 7, 1953 |

FOREIGN PATENTS

| | | |
|---|---|---|
| 122,157 | Austria | Apr. 10, 1931 |
| 253,819 | Great Britain | June 24, 1956 |
| 566,509 | Germany | Dec. 17, 1932 |
| 572,128 | Germany | Mar. 11, 1933 |